United States Patent
Mizobe

(10) Patent No.: US 10,880,969 B2
(45) Date of Patent: Dec. 29, 2020

(54) FLASHING LAMP AND METHOD FOR ADJUSTING FLASHING OF FLASHING LAMP

(71) Applicant: HotaluX, Ltd., Tokyo (JP)

(72) Inventor: Norimasa Mizobe, Tokyo (JP)

(73) Assignee: HotaluX, Ltd., Tokyo (JP)

( * ) Notice: Subject to any disclaimer, the term of this patent is extended or adjusted under 35 U.S.C. 154(b) by 0 days.

(21) Appl. No.: 16/637,424

(22) PCT Filed: Jul. 20, 2018

(86) PCT No.: PCT/JP2018/027256
§ 371 (c)(1),
(2) Date: Feb. 7, 2020

(87) PCT Pub. No.: WO2019/031195
PCT Pub. Date: Feb. 14, 2019

(65) Prior Publication Data
US 2020/0253020 A1  Aug. 6, 2020

(30) Foreign Application Priority Data
Aug. 8, 2017 (JP) ................. 2017-153453

(51) Int. Cl.
*B64F 1/20* (2006.01)
*H05B 45/52* (2020.01)
(Continued)

(52) U.S. Cl.
CPC ............... *H05B 45/52* (2020.01); *B64F 1/20* (2013.01); *F21S 10/06* (2013.01); *H05B 47/16* (2020.01);
(Continued)

(58) Field of Classification Search
None
See application file for complete search history.

(56) References Cited

U.S. PATENT DOCUMENTS

2018/0328550 A1  11/2018 Mizobe
2018/0335184 A1 * 11/2018 Wolfenden, Jr. ........ F21V 11/12

FOREIGN PATENT DOCUMENTS

| JP | 2007-137187 A | 6/2007 |
| JP | 2007137187 A * | 6/2007 |
| WO | 2017/081999 A1 | 5/2017 |

OTHER PUBLICATIONS

Engineering Brief No. 67D Light Sources Other Than Incandescent and Xenon for Airport Obstruction Lighting Fixtures, Federal Aviation Administration, Mar. 6, 2012, 14 pages.
(Continued)

*Primary Examiner* — Dedei K Hammond
(74) *Attorney, Agent, or Firm* — Sughrue Mion, PLLC

(57) ABSTRACT

A flashing lamp includes: an LED module and a light distribution unit disposed inside a housing, the light distribution unit is disposed on a light emission side of the LED module, and a light transmissive cover is disposed over an opening of the housing. The LED module includes: a plurality of LED rows; and an adjusting unit that adjusts flashing of the plurality of LED rows on a row-by-row basis. The plurality of LED rows are mounted on one surface of an LED-mounting board, each of the plurality of LED rows has a plurality of LEDs electrically connected on a row-by-row basis. When at least one LED row fails to illuminate, the adjusting unit extends a flashing time of each LED of the remaining LED rows to maintain a luminous intensity of the entire plurality of LED rows within a predetermined range.

8 Claims, 3 Drawing Sheets

(51) Int. Cl.
*H05B 47/16* (2020.01)
*F21S 10/06* (2006.01)
*F21Y 115/10* (2016.01)

(52) U.S. Cl.
CPC ....... *B64D 2203/00* (2013.01); *F21Y 2115/10* (2016.08)

(56) References Cited

OTHER PUBLICATIONS

International Search Report for PCT/JP2018/027256 dated Sep. 18, 2018 [PCT/ISA/210].

* cited by examiner

FLASHING LAMP AND METHOD FOR ADJUSTING FLASHING OF FLASHING LAMP

CROSS REFERENCE TO RELATED APPLICATIONS

This application is a National Stage of International Application No. PCT/JP2018/027256 filed Jul. 20, 2018, claiming priority based on Japanese Patent Application No. 2017-153453 filed Aug. 8, 2017, the disclosure of which is incorporated herein in its entirety by reference.

TECHNICAL FIELD

The present invention relates to a flashing lamp and a method for adjusting flashing of a flashing lamp.

BACKGROUND ART

In recent years, light-emitting diode (LED) flashing lamps have been used for guiding an aircraft landing to a runway in an airport or the like.

In the Engineering Brief No. 67D (EB-67D, Non Patent Literature 1) stipulated by the Federal Aviation Administration (FAA), it is determined to turn off the LED flashing lamp when 25% or more of the LEDs fail to illuminate in the LED flashing lamp. In the lighting specification No. 204 revision 7 (Non Patent Literature 2) of the Civil Aviation Bureau of the Ministry of Land, Infrastructure, Transport and Tourism, it is determined to turn off the LED flashing lamp when 50% or more of the LEDs fail to illuminate in the LED flashing lamp.

CITATION LIST

Non Patent Literature

Non Patent Literature 1: Engineering Brief No.67D Light Sources Other Than Incandescent and Xenon For Airport Obstruction Lighting Fixtures, Federal Aviation Administration, Mar. 6, 2012

Non Patent Literature 2: Lighting Specification No. 204 revision 7, FX-3 type/FX-AV type flashing device specification, Ministry of Land, Infrastructure, Transport and Tourism, Civil Aviation Bureau, revised on May 23, 2017

SUMMARY OF INVENTION

Technical Problem

As the above-described LED flashing lamp, there is known a flashing lamp provided with n×m LEDs including a plurality of rows (for example, n rows) of series circuits in which a plurality of (for example, m) LEDs are electrically connected in series and the plurality of rows (n rows) of series circuits are electrically connected in parallel to an output unit for outputting a rated current. In such a LED flashing lamp, if one LED fails to illuminate due to a failure, power is not supplied to the LEDs electrically connected in series therewith, and all (m) LEDs in the same LED row fail to illuminate. For example, even if there is x row(s) of such a non-illuminated LED row in an LED flashing lamp provided at an airport in the United States where the FAA-specified standard should be complied, if (x/n)×100<25% is satisfied, the EB-67D is not violated even if the LED flashing lamp is not turned off. However, even if the number of non-illuminated LED rows is less than 25% of the total number of rows, the luminous intensity is lower than the case in which no LED fail to illuminate, and the visibility of the LED flashing lamp from the pilots is changed, which is not preferable.

Accordingly, it is an object of the present invention to provide a flashing lamp and a method for adjusting flashing of a flashing lamp that can maintain the luminous intensity within a predetermined range even when at least one LED row of all the LED rows fails to illuminate.

Solution to Problem

In order to achieve the above object, the present invention provides a flashing lamp including:
an LED module serving as a light source;
a light distribution unit;
a housing having an opening; and
a light transmissive cover, wherein
the LED module and the light distribution unit are disposed inside the housing,
the light distribution unit is disposed on a light emission side of the LED module,
the light transmissive cover is disposed over the opening of the housing,
the LED module includes:
an LED-mounting board;
a plurality of LED rows; and
an adjusting unit that adjusts flashing of the plurality of LED rows on a row-by-row basis,
the plurality of LED rows are mounted on one surface of the LED-mounting board,
each of the plurality of LED rows is a row in which a plurality of LEDs are electrically connected,
the plurality of LED rows are electrically connected to each other on a row-by-row basis, and
when at least one LED row of all the LED rows fails to illuminate, the adjusting unit extends a flashing time of each LED of remaining LED rows to maintain a luminous intensity of the entire plurality of LED rows within a predetermined range.

The present invention also provides a method for adjusting flashing of a flashing lamp provided with a plurality of LED rows, including the steps of:
flashing the plurality of LED rows; and
adjusting flashing of the plurality of LED rows on a row-by-row basis, wherein
each of the plurality of LED rows is a row in which a plurality of LEDs are electrically connected,
the plurality of LED rows are electrically connected to each other on a row-by-row basis, and
in the adjusting step, when at least one LED row of all the LED rows fails to illuminate, a flashing time of each LED of remaining LED rows is extended to maintain a luminous intensity of the entire plurality of LED rows within a predetermined range.

Advantageous Effects of Invention

According to the present invention, it is possible to provide a flashing lamp and a method for adjusting flashing of a flashing lamp that can maintain the luminous intensity within a predetermined range even when at least one LED row of all the LED rows fails to illuminate.

DESCRIPTION OF EMBODIMENTS

Figure 1:
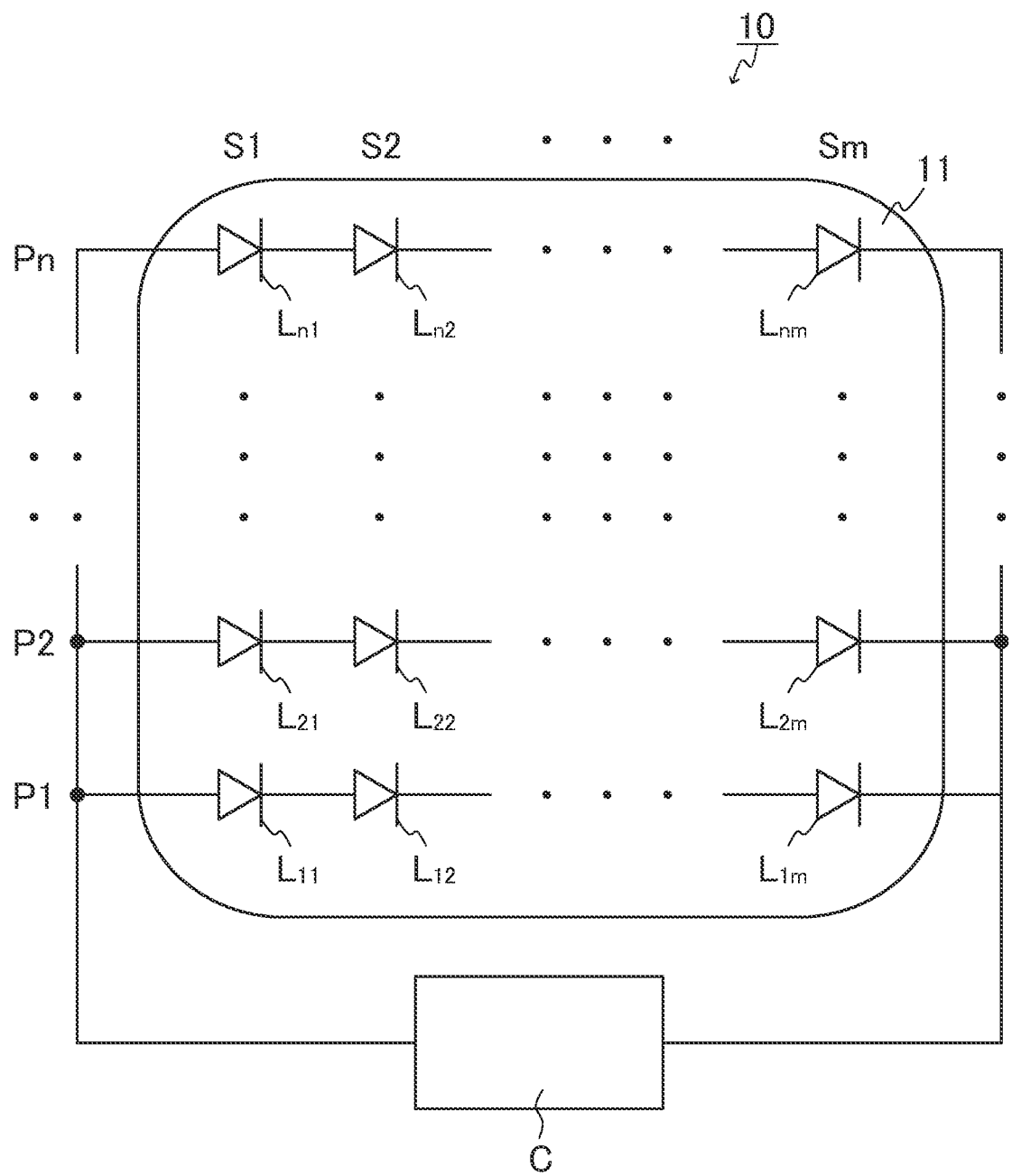
FIG. 1 is a plan view showing an exemplary configuration of an LED module in a flashing lamp of the present invention.
Figure 2:
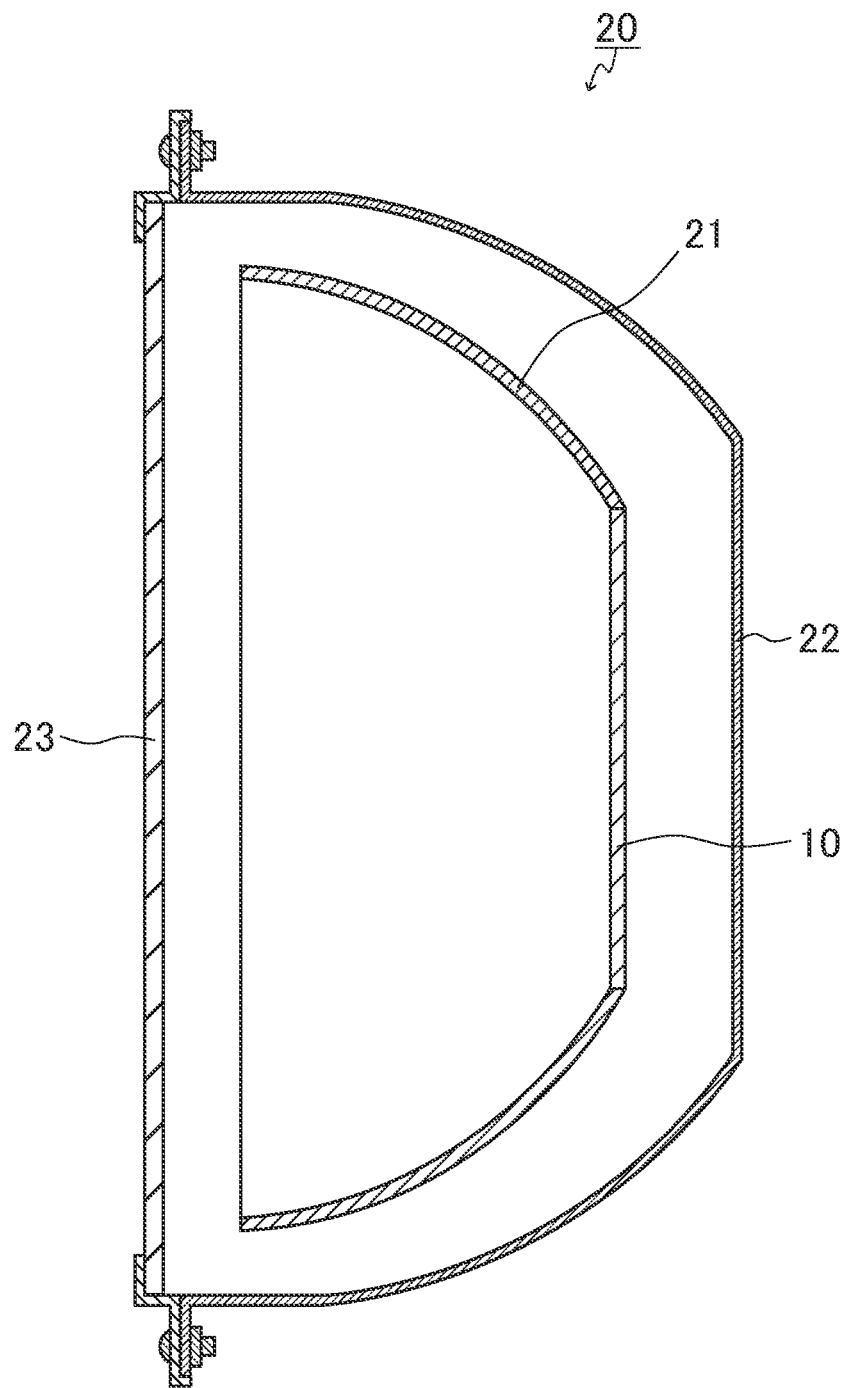
FIG. 2 is a cross-sectional view showing an exemplary configuration of the flashing lamp of the present invention.
Figure 3:
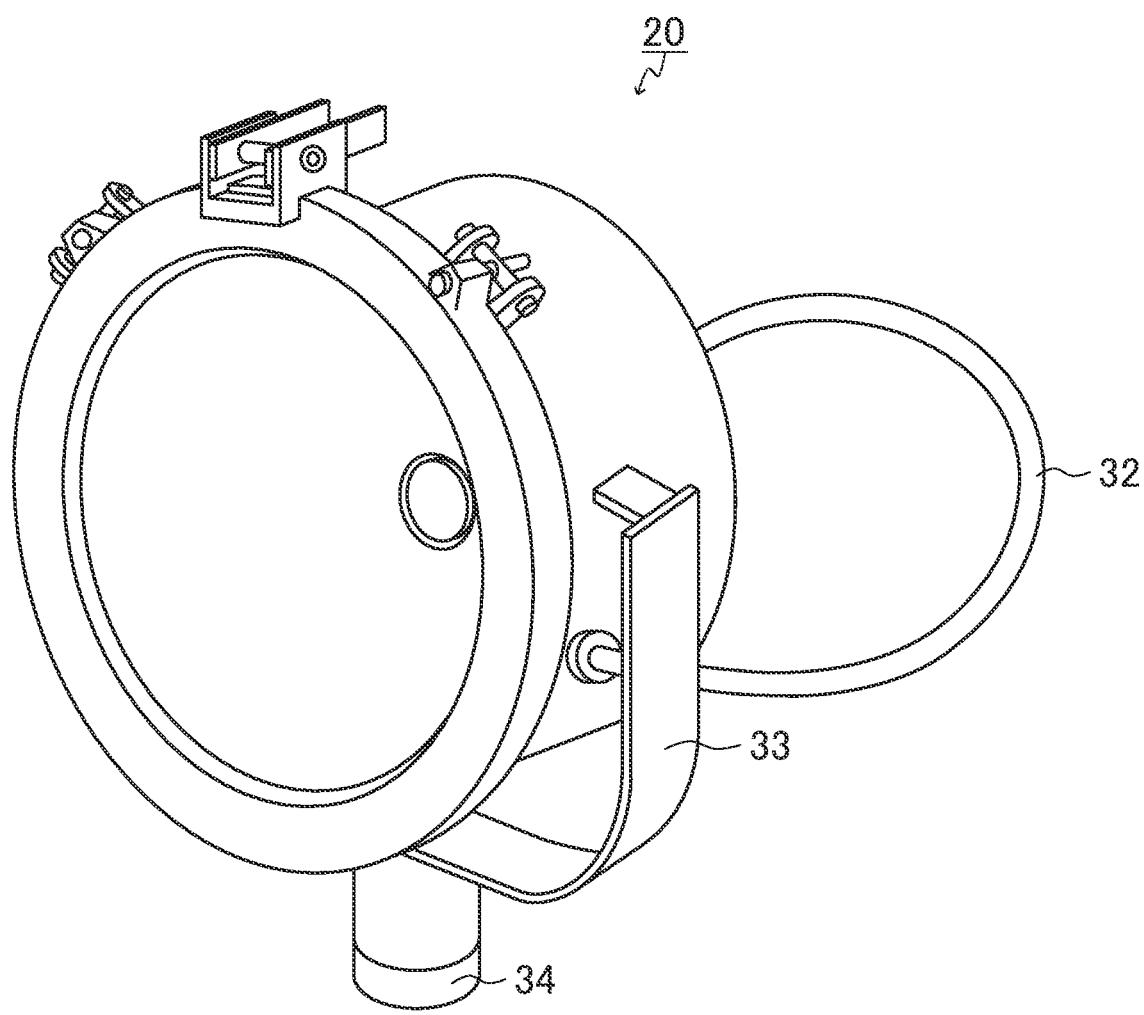
FIG. 3 is a perspective view showing an exemplary installation of the flashing lamp of the present invention.

The flashing lamp and the method for adjusting flashing of a flashing lamp of the present invention are described below with reference to the drawings. The present invention, however, is not limited or restricted to the following example embodiments by any means. In FIGS. 1 to 3, identical parts are indicated with identical reference sign. Furthermore, in the drawings, for convenience in explanation, illustration of the structures of the components may be simplified as appropriate, and the ratio of sizes of components and the like may be schematically shown and different from actual ones.

The cross-sectional view of FIG. 2 shows an exemplary configuration of a flashing lamp of the present invention. As shown in FIG. 2, a flashing lamp 20 includes an LED module 10 as a light source, a light distribution unit 21, a housing 22 having an opening, and a light transmissive cover 23. The LED module 10 and the light distribution unit 21 are disposed inside the housing 22, and the light transmissive cover 23 is disposed over the opening of the housing 22.

The light distribution unit 21 is disposed on the light emission side of the LED module 10. That is, in FIG. 2, the light distribution unit 21 is disposed in the direction in which the LED module 10 emits light (on the left side relative to the LED module 10). The light distribution unit 21 is a unit configured to transmit the light emitted by the LED module 10 to the light transmissive cover 23 side by, for example, reflection, condensation, diffusion, or the like. The type of the light distribution unit 21 is not particularly limited, and examples thereof include a reflector and a lens. The light distribution unit 21 may be, for example, one of the reflector and the lens, or a combination of the reflector and the lens.

When the light distribution unit 21 is a reflector, the material for forming the reflector is not particularly limited, and examples thereof include metals such as aluminum, magnesium, and alloys thereof, and the like; and resins such as PC (polycarbonate), PBT (polybutylene terephthalate), and the like. As the reflector, for example, a reflector whose reflection efficiency is further improved by applying high reflection processing on the reflection surface may be used. The high reflection processing is, for example, plating, application of a high reflection paint, or the like.

When the light distribution unit 21 is a reflector, the shape of the reflector is not particularly limited. The reflector has, for example, a cylindrical shape as shown in FIG. 2. It is preferable that the LED-mounting region of the LED module 10 is located at one of openings of the cylindrical reflector (on the right side in FIG. 2) and the light from the LED module 10 is emitted to the inside of the cylindrical reflector. For example, as shown in FIG. 2, the cylindrical reflector may have a tapered shape whose inner wall widens as it extends from the LED module 10 toward the opening of the housing 22, and this shape may be referred to as an umbrella shape, for example. The cross section of the inner wall of the cylindrical reflector extending from the LED module 10 toward the opening of the housing 22 may have, for example, an arc shape as shown in FIG. 2, or may have a flat straight shape.

The light distribution unit 21 may be, for example, a lens as described above. The lens is disposed on the LED-mounting surface side of the LDE module 10, for example, so as to receive light emitted from the LED module 10 and to distribute the light by diffusion, scattering, or the like. The lens may be, for example, a convex lens having a spherical surface on the side of the opening of the housing 22.

The material for forming the housing 22 is not particularly limited and examples thereof include aluminum and resins. The shape of the housing 22 is not particularly limited, and may be, for example, an umbrella shape as shown in FIG. 2.

The light transmissive cover 23 is disposed so as to cover the opening of the housing 22, and light from the inside of the housing 22 transmits the light transmissive cover 23. The material for forming the light transmissive cover 23 is not particularly limited as long as most of the light emitted from the LED module 10 can transmits therethrough, and a specific example thereof is glass or the like.

The plan view of FIG. 1 shows an exemplary configuration of the LED module 10. As shown in FIG. 1, the LED module 10 of the present example includes an LED-mounting board 11, a plurality of LED rows P1 to Pn, and an adjusting unit C that adjusts flashing of the plurality of LED rows P1 to Pn on a row-by-row basis. The plurality of LED rows P1 to Pn are mounted on one surface (mounting surface) of the LED-mounting board 11.

The LED-mounting board 11 is not particularly limited, and may be, for example, an insulating substrate. Examples of the insulating substrate include a metal substrate made of aluminum, copper, or the like; and a resin substrate made of paper phenol, paper epoxy, glass composite, or the like. The size of the LED-mounting board 11 is not particularly limited, and can be appropriately determined depending on, for example, the size, the use location, the application, or the like of the flashing lamp 20. For example, in the flashing lamp for aircraft landing guidance, the area of the region in the mounting surface where the plurality of LED rows P1 to Pn are mounted is, for example, 60 to 120 cm$^2$.

Each of the plurality of LED rows P1 to Pn is a row in which a plurality of LEDs are electrically connected, and the plurality of LED rows P1 to Pn are electrically connected to each other on a row-by-row basis. For example, in the LED modules 10 shown in FIG. 1, the n rows of LED rows P1, P2, . . . , Pn are rows in which m ($L_{11}$ to $L_{1m}$, $L_{21}$ to $L_{2m}$ . . . , $L_{n1}$ to $L_{nm}$) LEDs are electrically connected in series and are electrically connected in parallel to each other on a row-by-row basis. The number (n) of all the LED rows P1 to Pn is, for example, 4 to 16. The number (m) (the number of the LEDs electrically connected in series in each LED row) is, for example, 10 to 100. The shape of each of LEDs ($L_{11}$ to $L_{nm}$) is not particularly limited, and is generally a square shape or a rectangular shape. The size of each of LEDs ($L_{11}$ to $L_{nm}$) is not particularly limited, and in the case of the square, the length of one side is, for example, 1.8 to 2.2 mm, 3 to 3.5 mm, or 4 to 5.3 mm, and in the case of the rectangle, the length of the short side is, for example, the same as the length of the side of the square, and the ratio of the short side to the long side is, for example, 1:1 to 1:3. In the mounting surface of the LED-mounting substrate 11, when the adjacent LEDs are separated from each other, the distance between the adjacent LEDs is, for example, 0.2 to 0.5 mm.

When at least one LED row of all the LED rows P1 to Pn fails to illuminate, the adjusting unit C extends the flashing time of each LED of the remaining LED rows to maintain the luminous intensity of the entire plurality of LED rows P1 to Pn within a predetermined range. The adjusting unit C may be capable of outputting a rated current, such as 2A, for example. The LED module 10 may include a rated current output unit independently of the adjusting unit C.

Next, the method for adjusting flashing of a flashing lamp of the present invention (hereinafter, sometimes referred to as "flashing adjusting method") is described below with reference to the case of the LED module 10 shown in FIG. 1 as an example. The flashing adjusting method includes the steps of: flashing a plurality of LED rows P1 to Pn; and adjusting flashing of the plurality of LED rows P1 to Pn on a row-by-row basis.

When none of the plurality of LEDs ($L_{11}$ to $L_{nm}$) is faulty, all of the LED rows P1 to Pn are flashed in the flashing step, and the flashing of the plurality of LED rows P1 to Pn is adjusted on a row-by-row basis in the adjusting step. Here, for example, when the LED ($L_{11}$) fails to illuminate due to a failure, power is not supplied to the other LEDs ($L_{12}$ to $L_{1m}$) in the LED row P1 electrically connected in series with the LED ($L_{11}$), and all (m) LEDs ($L_{11}$ to $L_{1m}$) in the LED row P1 fail to illuminate. When there is such a non-illuminated LED row P1, the luminous intensity is lowered as a whole as compared with the case where there is no non-illuminated LED, which is not preferable. Therefore, in the flashing adjusting method, in the adjusting step, when at least one LED row of the LED row P1 of all the LED rows P1 to Pn fails to illuminate, the flashing time of each LED ($L_{21}$ to $L_{nm}$) of the remaining LED rows P2 to Pn is extended to maintain the luminous intensity of the entire plurality of LED rows P1 to Pn within a predetermined range. In this case, the luminous intensity of the entire plurality of LED rows P1 to Pn can be maintained within a predetermined range also by increasing the current output from the adjusting unit C or the rated current output unit, however, in this case, each LED ($L_{21}$ to $L_{nm}$) of the remaining LED rows P2 to Pn is heavily loaded. In contrast, according to the flashing adjusting method, by extending the flashing time of each LED ($L_{21}$ to $L_{nm}$) of the remaining LED rows P2 to Pn, the luminous intensity of the entire plurality of LED rows P1 to Pn can be maintained within a predetermined range without applying a large load to each LED ($L_{21}$ to $L_{nm}$) of the remaining LED rows P2 to Pn.

In the flashing lamp and the flashing adjusting method of the present invention, the luminous intensity means an effective luminous intensity. The unit of the light output of each LED ($L_{11}$ to $L_{nm}$) is the effective luminous intensity (cd). The effective luminous intensity of the LED module 10 is, for example, 6,000 to 20,000 cd per flashing time of 1 to 5 msec. In the flashing lamp and the flashing adjusting method of the present invention, the effective luminous intensity (cd) per flashing time is expressed by the value calculated by the relational expression (Blondel-Rey-Douglas equation) between the light emission luminous intensity (luminous intensity at the moment of flashing) and the flashing time. The effective luminous intensity (Ie) can be expressed by, for example, the following equation.

$$Ie = \frac{\int_{t_1}^{t_2} I(t)dt}{a + (t_2 - t_1)} \qquad \text{Equation 1}$$

$$a = 0.21$$

t1, t2: value at which Ie shows maximum value during flashing time
I(t): luminous intensity at time t In the flashing lamp of the present invention, for example, the adjusting unit C may include a determining unit, and the determining unit may determine the extended flashing time (Te) of each LED of the remaining LED rows based on the equation (1) below. In the flash adjusting method, the adjusting step may include a determining step, and, in the determining step, the extended flashing time (Te) of each LED of the remaining LED rows may be determined based on the equation (1) below, for example. In the following equation (1), the correction coefficient C can be appropriately determined, and is, for example, 0.3 to 1, or 0.5.

$$Te=(T0{\times}L0)/(L0-Le{\times}C) \qquad (1)$$

T0: flashing time of LED before extension
L0: number (n) of all LED rows
Le: number of non-illuminated LED rows out of all LED rows
C: correction factor In the flashing lamp and the flashing adjusting method of the present invention, for example, the flashing time (T0) of the LEDs before extension may be set according to at least one of the weather and the time zone of the installation location of the flashing lamp. As an example, the flashing time (T0) may be set such that the brightness is switchable among three levels according to the standard specifications of the Ministry of Land, Infrastructure, Transport and Tourism. Among these three levels of brightness, at the brightest level "High", which is used, for example, in the daytime of poor visibility due to fog, rain, or the like, the flashing time (T0) is set to, for example, 2.2 msec, at the darkest level "Low", which is used, for example, in the night, the flashing time (T0) is set to, for example, 0.07 msec, and at the intermediate level "Middle", which is used, for example, in the evening, the flashing time (T0) is set to, for example, 0.25 msec.

In the flashing lamp of the present invention, for example, the adjusting unit C may include a light-off unit, and the light-off unit may turn off the flashing lamp 20 when the ratio of the number of non-illuminated LED rows to the number of all the LED rows P1 to Pn exceeds a predetermined value. In the flashing adjusting method, the adjusting step may include a light-off step, and in the light-off step, the flashing lamp 20 may be turned off when the ratio of the number of non-illuminated LED rows to the number of all the LED rows P1 to Pn exceeds a predetermined value. The predetermined value may be set as appropriate in accordance with the situations where the flashing lamp and the flashing adjusting method of the present invention are used, for example, the predetermined value may be set to 25% in the U.S. airport which needs to comply with the EB-67D, and 50% in the Japanese airport which needs to comply with the lighting specification No. 204 revision 7.

In the flashing lamp and the flashing adjusting method of the present invention, the luminous intensity of the entire plurality of LED rows P1 to Pn in the state where there is a non-illuminated LED row(s) is not necessarily the same as the state where there is no non-illuminated LED row(s) (before a non-illuminated LED row occurs). For example, if the luminous intensity of the entire plurality of LED rows P1 to Pn is lowered within an allowable range when there is a non-illuminated LED row(s) in a situation where the flashing lamp and the flashing adjusting method of the present invention are used, the loads on the LEDs of the remaining LED rows can be further reduced.

The applications of the flashing lamp and the flashing adjusting method of the present invention are not particularly limited, and the flashing lamp and the flashing adjusting method can be suitably used, for example, for aircraft landing guidance.

An installation example of the flashing lamp of the present invention is described below with reference to FIG. 3. In addition to the configuration of FIG. 2, for example, the flashing lamp 20 of the present example may further include an arm 33 and a leg 34 and may be installed on the ground by the leg 34. The flashing lamp 20 of the present example may further include, for example, a cable 32 for supplying power to the LED module 10. Furthermore, the flashing lamp 20 of the present example may be installed on a pole provided on the ground, for example.

For example, when the flashing lamp 20 is provided in a large airport having a plurality of runways, 8 to 29 flashing lamps 20 are arranged at intervals of about 30 m from the approach direction of the aircraft toward the end of the runway. Furthermore, for example, when the flashing lamp 20 is provided in a small airport where the number of arrival and departure of an aircraft is small and is provided with only one short runway, one flashing lamp 20 is arranged at each side of the runway end in the short direction so as to flash (blink) a total of two lamps simultaneously. Furthermore, when the flashing lamp 20 is provided in an airport where an aircraft cannot enter the runway straight, for example, the flashing lamp 20 is strategically arranged at a predetermined position on the approach to the runway, for example, every several kilometers.

While the present invention has been described above with reference to illustrative example embodiments, the present invention is by no means limited thereto. Various changes and variations that may become apparent to those skilled in the art may be made in the configuration and specifics of the present invention without departing from the scope of the present invention.

This application claims priority from Japanese Patent Application No. 2017-153453 filed on Aug. 8, 2017. The entire subject matter of the Japanese Patent Application is incorporated herein by reference.

Industrial Applicability

According to the present invention, it is possible to provide a flashing lamp and a method for adjusting flashing of a flashing lamp that can maintain the luminous intensity within a predetermined range even when at least one LED row of the LED rows fails to illuminate. The flashing lamp and the method for adjusting flashing of a flashing lamp of the present invention can be used in a wide variety of applications, for example, for aircraft landing guidance.

REFERENCE SIGNS LIST

P1 to Pn: LED row
$L_{11}$~$L_{nm}$: LED
C: adjusting unit
10: LED module
11: LED-mounting board
20: flashing lamp
21: light distribution unit
22: housing
23: light transmissive cover

The invention claimed is:

1. A flashing lamp comprising:
an LED module serving as a light source;
a light distribution unit;
a housing having an opening; and
a light transmissive cover, wherein
the LED module and the light distribution unit are disposed inside the housing,
the light distribution unit is disposed on a light emission side of the LED module,
the light transmissive cover is disposed over the opening of the housing,
the LED module comprises:
an LED-mounting board;
a plurality of LED rows; and
an adjusting unit that adjusts flashing of the plurality of LED rows on a row-by-row basis,
the plurality of LED rows are mounted on one surface of the LED-mounting board,
each of the plurality of LED rows is a row in which a plurality of LEDs are electrically connected,
the plurality of LED rows are electrically connected to each other on a row-by-row basis, and
when at least one LED row of all the LED rows fails to illuminate, the adjusting unit extends a flashing time of each LED of remaining LED rows to maintain a luminous intensity of the entire plurality of LED rows within a predetermined range.

2. The flashing lamp according to claim 1, wherein
the adjusting unit comprises a determining unit, and
the determining unit determines an extended flashing time (Te) of each LED of the remaining LED rows based on equation (1) below $$Te=(T0 \times L0)/(L0-Le \times C) \qquad (1)$$

T0: flashing time of LED before extension
L0: number of all LED rows
Le: number of non-illuminated LED rows out of all LED rows
C: correction factor.

3. The flashing lamp according to claim 1, wherein
the adjusting unit comprises a light-off unit, and
the light-off unit turns off the flashing lamp when a ratio of the number of non-illuminated LED rows to the number of all the LED rows exceeds a predetermined value.

4. The flashing lamp according to claim 1, wherein
the flashing lamp is for aircraft landing guidance.

5. A method for adjusting flashing of a flashing lamp provided with a plurality of LED rows, comprising the steps of:
flashing the plurality of LED rows; and
adjusting flashing of the plurality of LED rows on a row-by-row basis, wherein each of the plurality of LED rows is a row in which a plurality of LEDs are electrically connected, the plurality of LED rows are electrically connected to each other on a row-by-row basis, and in the adjusting step, when at least one LED row of all the LED rows fails to illuminate, a flashing time of each LED of remaining LED rows is extended to maintain a luminous intensity of the entire plurality of LED rows within a predetermined range.

6. The method according to claim 5, wherein the adjusting step comprises a determining step, and in the determining step, an extended flashing time (Te) of each LED of the remaining LED rows is determined based on equation (1) below $$Te = (T0 \times L0)/(L0 - Le \times C) \quad (1)$$

T0: flashing time of LED before extension
L0: number of all LED rows
Le: number of non-illuminated LED rows out of all LED rows
C: correction factor.

7. The method according to claim 5, wherein the adjusting step comprises a light-off step, and in the light-off step, the flashing lamp is turned off when a ratio of the number of non-illuminated LED rows to the number of all the LED rows exceeds a predetermined value.

8. The method according to claim 5, wherein the flashing lamp is for aircraft landing guidance.

\* \* \* \* \*